(12) United States Patent
Fu et al.

(10) Patent No.: US 11,294,730 B2
(45) Date of Patent: Apr. 5, 2022

(54) PROCESS PLACEMENT IN A CLOUD ENVIRONMENT BASED ON AUTOMATICALLY OPTIMIZED PLACEMENT POLICIES AND PROCESS EXECUTION PROFILES

(71) Applicant: Telefonaktiebolaget LM Ericsson (publ), Stockholm (SE)

(72) Inventors: Chunyan Fu, Pointe-Claire (CA); Joacim Halén, Sollentuna (SE); Wolfgang John, Haninge (SE); Mina Sedaghat, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

(21) Appl. No.: 16/960,522

(22) PCT Filed: Jan. 4, 2019

(86) PCT No.: PCT/SE2019/050004
§ 371 (c)(1),
(2) Date: Jul. 7, 2020

(87) PCT Pub. No.: WO2019/135703
PCT Pub. Date: Jul. 11, 2019

(65) Prior Publication Data
US 2020/0371841 A1    Nov. 26, 2020

Related U.S. Application Data

(60) Provisional application No. 62/614,571, filed on Jan. 8, 2018.

(51) Int. Cl.
*G06F 9/455* (2018.01)
*G06F 9/48* (2006.01)
*G06F 9/50* (2006.01)

(52) U.S. Cl.
CPC ............ *G06F 9/5055* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557;
(Continued)

(56) References Cited

U.S. PATENT DOCUMENTS

2006/0259621 A1    11/2006  Ranganathan et al.
2007/0143765 A1     6/2007  Aridor et al.
(Continued)

OTHER PUBLICATIONS

Andrews et al., "The Design of the Saguaro Distributed Operating System", IEEE Transactions on Software Engineering, vol. SE-13, No. 1, Jan. 1987, pp. 104-118.
(Continued)

*Primary Examiner* — Charles M Swift
(74) *Attorney, Agent, or Firm* — NDWE LLP

(57) ABSTRACT

A method for placement of processes in a distributed datacenter is described. The method includes receiving, by a first placement node, a placement request corresponding to a process; determining a load estimation for resources managed by the first placement node and a demand estimation for the process based on a process execution profile for the process; determining whether the placement request can be fulfilled with the resources managed by the first placement node based on the demand estimation of the process and the load estimation of the resources managed by the first placement node; executing the process with the resources managed by the first placement node in response to determining that the placement request can be fulfilled with the resources managed by the first placement node; generating an intermediate score based on the execution; and updating a
(Continued)

performance score of the process execution profile based on the intermediate score.

17 Claims, 10 Drawing Sheets

(52) U.S. Cl.
CPC .......... *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4868* (2013.01); *G06F 9/4875* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5027* (2013.01); *G06F 9/5044* (2013.01); *G06F 9/5061* (2013.01); *G06F 9/5072* (2013.01); *G06F 9/5077* (2013.01); *G06F 9/5083* (2013.01); *G06F 9/5088* (2013.01); *G06F 2009/4557* (2013.01); *G06F 2009/45575* (2013.01); *G06F 2209/501* (2013.01)

(58) Field of Classification Search
CPC .......... G06F 2009/45575; G06F 9/48; G06F 9/4806; G06F 9/4843; G06F 9/485; G06F 9/4856; G06F 9/4868; G06F 9/4875; G06F 9/4881; G06F 9/50; G06F 9/5005; G06F 9/5011; G06F 9/5027; G06F 9/5044; G06F 9/505; G06F 9/5055; G06F 9/5061; G06F 9/5072; G06F 9/5077; G06F 9/5083; G06F 9/5088
See application file for complete search history.

(56) References Cited

U.S. PATENT DOCUMENTS

| | | | | |
|---|---|---|---|---|
| 2011/0161973 | A1* | 6/2011 | Klots | H04L 43/0888 |
| | | | | 718/104 |
| 2013/0262556 | A1* | 10/2013 | Xu | G06F 9/5072 |
| | | | | 709/202 |
| 2013/0346993 | A1* | 12/2013 | Chen | G06F 9/5044 |
| | | | | 718/103 |
| 2014/0289733 | A1* | 9/2014 | Fritz | G06F 9/5066 |
| | | | | 718/104 |
| 2016/0239335 | A1* | 8/2016 | Anderson | G06F 9/5016 |
| 2016/0359668 | A1* | 12/2016 | Udupi | G06F 9/45533 |
| 2017/0295082 | A1* | 10/2017 | Wu | H04L 67/10 |
| 2019/0026150 | A1* | 1/2019 | Shimamura | G06F 9/5066 |
| 2019/0129874 | A1* | 5/2019 | Huang | G06F 9/5077 |
| 2019/0138361 | A1* | 5/2019 | Bernat | G06F 9/5044 |
| 2019/0173770 | A1* | 6/2019 | Gill | H04L 67/1097 |

OTHER PUBLICATIONS

Feller et al., "Energy-Aware Ant Colony Based Workload Placement in Clouds", 2011 12th IEEE/ACM International Conference on Grid Computing, Sep. 22, 2011, pp. 26-33.
Jennings et al., "Resource Management in Clouds: Survey and Research Challenges", Journal of Network and Systems Management, Jul. 2015, vol. 23, Issue 3, pp. 567-619.
Plakunov et al., "Data Center Resource Mapping Algorithm Based on the Ant Colony Optimization", IEEE First International Science and Technology Conference (Modern Networking Technologies) (MoNeTeC), Oct. 28-29, 2014, pp. 1-6.
Tawfeek et al., "Cloud task scheduling based on ant colony optimization", 8th International Conference on Computer Engineering & Systems (ICCES), Nov. 2013, pp. 64-69.
International Search Report and Written Opinion for Application No. PCT/SE2019/050004, dated Apr. 3, 2019, 12 pages.
International Preliminary Report on Patentability for Application No. PCT/SE2019/050004, dated Jul. 23, 2020, 10 pages.

\* cited by examiner

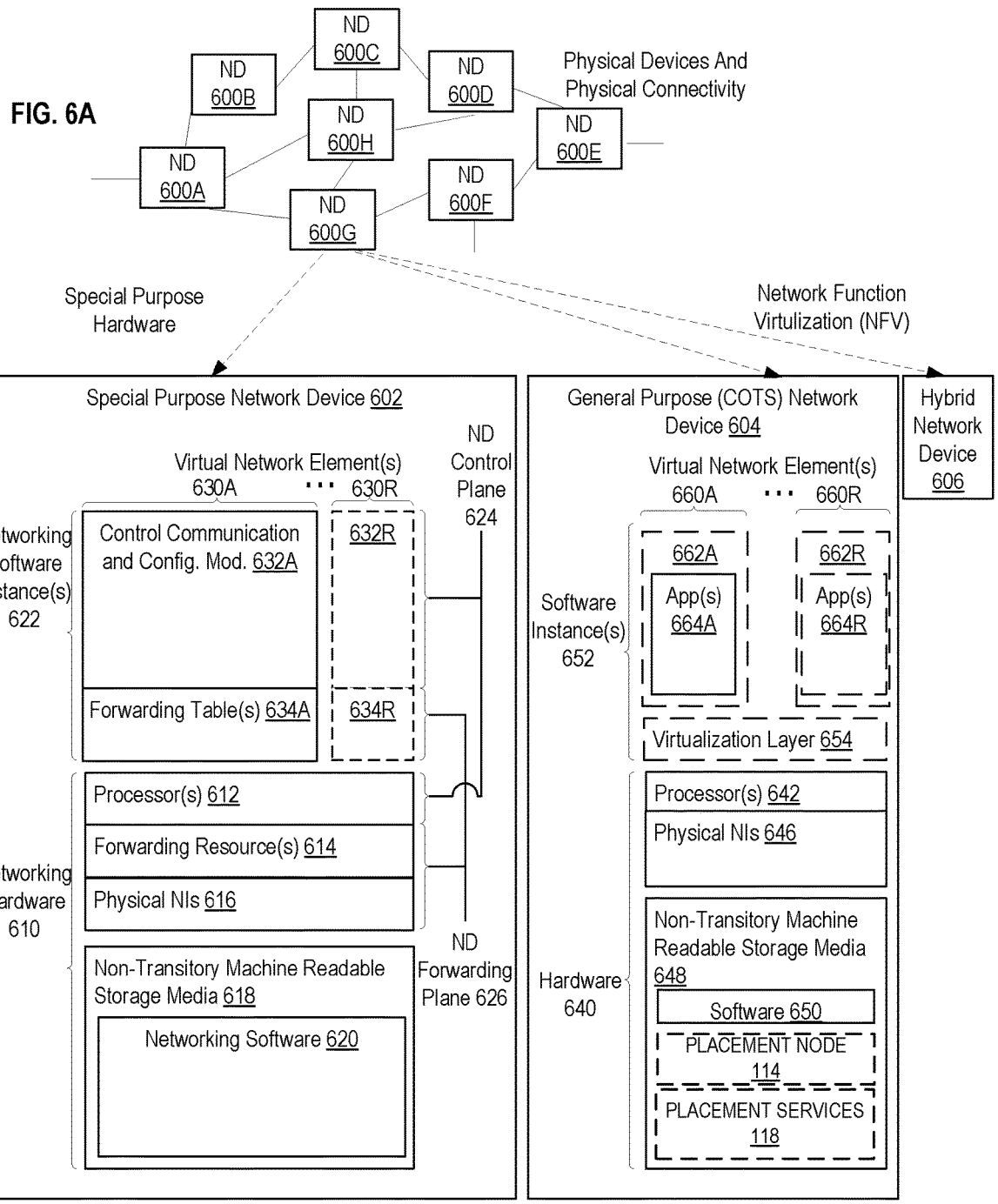

PROCESS PLACEMENT IN A CLOUD ENVIRONMENT BASED ON AUTOMATICALLY OPTIMIZED PLACEMENT POLICIES AND PROCESS EXECUTION PROFILES

CROSS-REFERENCE TO RELATED APPLICATIONS

This application is a National stage of International Application No. PCT/SE2019/050004, filed Jan. 4, 2019, which claims the benefit of U.S. Provisional Application No. 62/614,571, filed Jan. 8, 2018, which are hereby incorporated by reference.

TECHNICAL FIELD

Embodiments of the invention relate to the field of datacenter management; and more specifically, to process placement in a cloud environment based on automatically optimized placement policies and process execution profiles.

BACKGROUND ART

Cloud resource placement is a difficult problem that has been an active topic in recent years. One challenge includes achieving predictable performance for cloud-hosted applications, while at the same time allowing cloud service providers to reach better resource utilizations. Achieving this balance is difficult since application owners have difficulty in precisely estimating application resource demands. Based on these imprecise estimates, cloud service providers cannot properly size resource allocations. Difficulties in resource size allocations are made more difficult by the fact that allocations are mainly done by choosing among a number of predefined, fixed sized Virtual Machines (VMs), which are only rough estimations of application resource requirements. In this way, cloud service providers are either over-committing their resources to each user (i.e., VMs are larger than the application requirements), which results in overall low resource utilization, or cloud service providers under-commit their resources to applications, which may result in service level agreement violations.

Another challenge is to achieve global manageability across the cloud environment. This global manageability can include meeting specific performance targets across datacenters. This becomes especially difficult in Internet of Things (IoT) or edge cloud scenarios due to the diversity of equipment and deployments. Centralized resource placement policies may lead to sub-optimal decisions in specific domains or areas (e.g., in specific IoT deployments) as a single policy rarely meet the needs of each.

In next generation cloud platforms (i.e., Cloud 3.0), programmers will no longer need to handle the complexity of cloud infrastructures. For instance, programmers will be allowed to abstract the cloud as one giant computer. Moreover, the size of the executing units will further shrink, from gigabyte-sized VMs to one-hundred-megabyte-sized containers, and eventually to even more lightweight Linux-like processes.

A finer-grained execution unit leads to more flexibility in deployment and possibly better resource utilization. However, having processes as the deployment unit complicates resource allocation, as the processes are not often offered as pre-defined size instances. Further, with smaller sized deployment units, if a placement policy is not properly selected, it may lead to resource defragmentation and stranding, such placement of large-scaled programs will be difficult.

SUMMARY

A method for placement of processes in a distributed datacenter is described. The method includes receiving, by a first placement node in the datacenter system from a process agent of a client device, a placement request corresponding to a process; determining, by the first placement node, a load estimation for resources managed by the first placement node and a demand estimation for the process based on a process execution profile for the process; determining, by the first placement node, whether the placement request can be fulfilled with the resources managed by the first placement node based on the demand estimation of the process and the load estimation of the resources managed by the first placement node; executing the process with the resources managed by the first placement node in response to determining that the placement request can be fulfilled with the resources managed by the first placement node; generating, by the first placement node, an intermediate score based on the execution of the process with resources managed by the first placement node; and updating, by the first placement node, a performance score of the process execution profile based on the intermediate score, wherein the performance score of the process execution profile is increased in response to the intermediate score indicating a successful execution of the process using the resources managed by the first placement node.

A non-transitory machine-readable storage medium that provides instructions that, if executed by a processor of a first placement node in a datacenter system, will cause said processor to perform operations is also described. The operations include receiving, from a process agent of a client device, a placement request corresponding to a process; determining a load estimation for resources managed by the first placement node and a demand estimation for the process based on a process execution profile for the process; determining whether the placement request can be fulfilled with the resources managed by the first placement node based on the demand estimation of the process and the load estimation of the resources managed by the first placement node; causing the process to be executed with the resources managed by the first placement node in response to determining that the placement request can be fulfilled with the resources managed by the first placement node; generating an intermediate score based on the execution of the process with resources managed by the first placement node; and updating a performance score of the process execution profile based on the intermediate score, wherein the performance score of the process execution profile is increased in response to the intermediate score indicating a successful execution of the process using the resources managed by the first placement node.

A system for placement of processes in a distributed datacenter is also described. The system includes a memory unit that stores instructions; and a processor coupled to the memory unit to execute the instructions. The instructions are to cause the system to: receive, from a process agent of a client device, a placement request corresponding to a process; determine a load estimation for resources managed by the first placement node and a demand estimation for the process based on a process execution profile for the process; determine whether the placement request can be fulfilled with the resources managed by the first placement node based on the demand estimation of the process and the load estimation of the resources managed by the first placement node; cause the process to be executed with the resources managed by the first placement node in response to determining that the placement request can be fulfilled with the resources managed by the first placement node; generate an intermediate score based on the execution of the process with resources managed by the first placement node; and update a performance score of the process execution profile based on the intermediate score, wherein the performance score of the process execution profile is increased in response to the intermediate score indicating a successful execution of the process using the resources managed by the first placement node.

As described herein, placement policies and/or process execution profiles are optimized without needing manual configuration by a user or an administrator. In particular, through the generation of performance scores that describe the performance of execution of a process using a particular process execution profile, the datacenter system can intelligently estimate process resource demands for use in process placement.

BRIEF DESCRIPTION OF THE DRAWINGS

The invention may best be understood by referring to the following description and accompanying drawings that are used to illustrate embodiments of the invention. In the drawings:

FIG. 6A illustrates connectivity between network devices (NDs) within an exemplary network, as well as three exemplary implementations of the NDs, according to some embodiments.

FIG. 6B illustrates an exemplary way to implement a special-purpose network device according to some embodiments.

DETAILED DESCRIPTION

The following description describes methods and apparatus for distributed resource management in cloud infrastructures through the use of automatically optimized placement policies and process execution profiles. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the embodiments described herein. It will be appreciated, however, by one skilled in the art that the embodiments described herein may be practiced without such specific details. In other instances, control structures, gate level circuits and full software instruction sequences have not been shown in detail in order not to obscure the embodiments described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
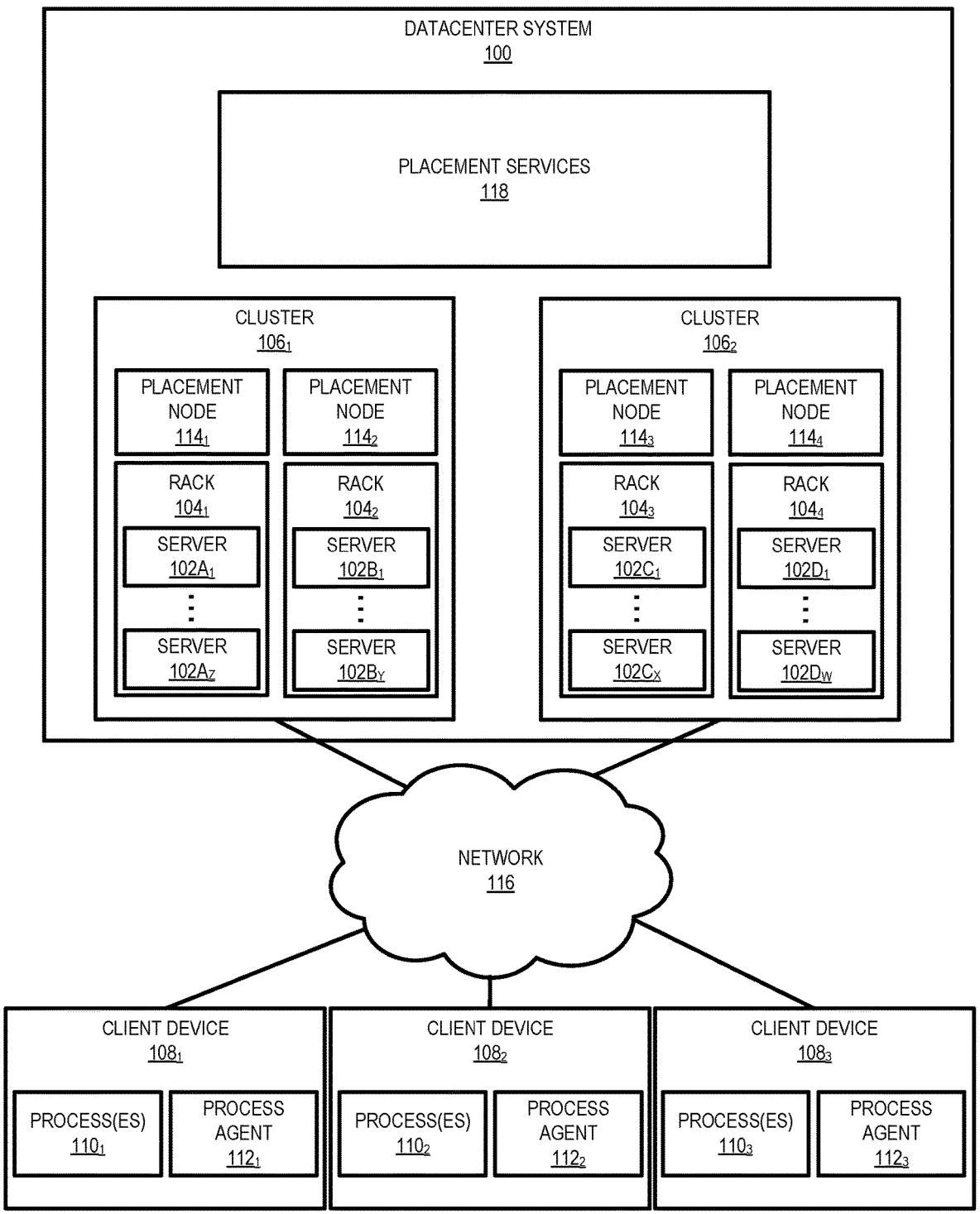
FIG. 1 shows a datacenter system for decentralized and distributed resource management in cloud infrastructures through the use of automatically optimized placement policies and/or process execution profiles, according to one example embodiment.

FIG. 1 shows a datacenter system 100 for decentralized and distributed resource management in cloud infrastructures through the use of automatically optimized placement policies and/or process execution profiles, according to one example embodiment. As shown in FIG. 1, the datacenter system 100 includes sets of servers 102 that may be statically arranged into particular configurations. For example, a first set of servers $102A_1$-$102A_Z$ may be arranged in a first rack $104_1$, a second set of servers $102B_1$-$102B_Y$ may be arranged in a second rack $104_2$, a third set of servers $102C_1$-$102C_X$ may be arranged in a third rack $104_3$, and a fourth set of servers $102D_1$-$102D_W$ may be arranged in a fourth rack $104_4$. As used herein, a rack 104 (sometimes referred to as a server rack 104) is an equipment structure that is designed to hold multiple servers 102 in associated bays of the rack 104.

The racks 104 may be further grouped into clusters 106 (e.g., the racks $104_1$ and $104_2$ are grouped into a first cluster $106_1$ while the racks $104_3$ and $104_4$ are grouped into a second cluster $106_2$). The organization/grouping of servers 102 into racks 104 and clusters 106 may correspond to physical proximity of the servers 102. For example, all servers 102 in the same cluster 106 may be installed in the same building/location. For instance, each of the servers 102 within a cluster 106 are communicatively coupled together in a single physical location. Accordingly, the servers $102A_1$-$102A_Z$ and $102B_1$-$102B_Y$ in the first cluster $106_1$ are at a first location, while the servers $102C_1$-$102C_X$ and $102D_1$-$102D_W$ in the second cluster $106_2$ are at a second location. This physical arrangement of servers 102 is static and cannot be easily manipulated/altered, and particularly cannot be easily or quickly manipulated/altered to meet demands of processes.

Although shown with two sets of clusters 106 that each include two racks 104 of servers 102, in other embodiments, the number of clusters 106, racks 104, and servers 102 in the datacenter system 100 may be different. In some cases, one or more clusters 106, racks 104, and/or servers 102 may be added to or removed from the datacenter system 100 periodically during normal operation of the datacenter system 100. Accordingly, the configuration of the datacenter system 100 shown in FIG. 1 is for illustrative purposes.

A server 102, as used herein, is an electronic device that provides resources for processes 110 in a client-server model. The resources provided by the servers 102 may include items to support processing/execution of the processes 110, such as physical or logical processors and/or cores and memory. For example, the client devices $108_1$-$108_3$ may each include one or more corresponding processes $110_1$-$110_3$, which each require a set of resources for processing/execution. The processes $110_1$-$110_3$ are computer software designed to perform a group of coordinated functions, tasks, or activities and may be part of a larger application running on respective client devices $108_1$-$108_3$. The processes $110_1$-$110_3$ may be managed or otherwise monitored by respective process agents $112_1$-$112_3$ that ensure a set of resources are allocated/reserved for processing/execution of their respective processes $110_1$-$110_3$. Each of the client devices $108_1$-$108_3$ may be coupled to the datacenter system 100 via the network 116 such that the process agents $112_1$-$112_3$ may request the datacenter system 100 reserve/allocate a set of resources for processing/execution of their respective processes $110_1$-$110_3$ based on continually optimized placement policies and/or process execution profiles.

In particular, the datacenter system 100 may include a set of placement nodes 114 that manage or are otherwise associated with sets of servers 102. For example, the set of servers $102A_1$-$102A_Z$, which are organized in the rack $104_1$, are associated with the placement node $114_1$, the set of servers $102B_1$-$102B_Y$, which are organized in the rack $104_2$, are associated with the placement node $114_2$, the set of servers $102C_1$-$102C_X$, which are organized in the rack $104_3$, are associated with the placement node $114_3$, and the set of servers $102D_1$-$102D_W$, which are organized in the rack $104_4$, are associated with the placement node $114_4$. Each of the placement nodes 114, in conjunction with placement services 118, may assign/reserve resources in the datacenter system 100 based on automatically configured placement polices and/or process execution profiles.

Figure 2:
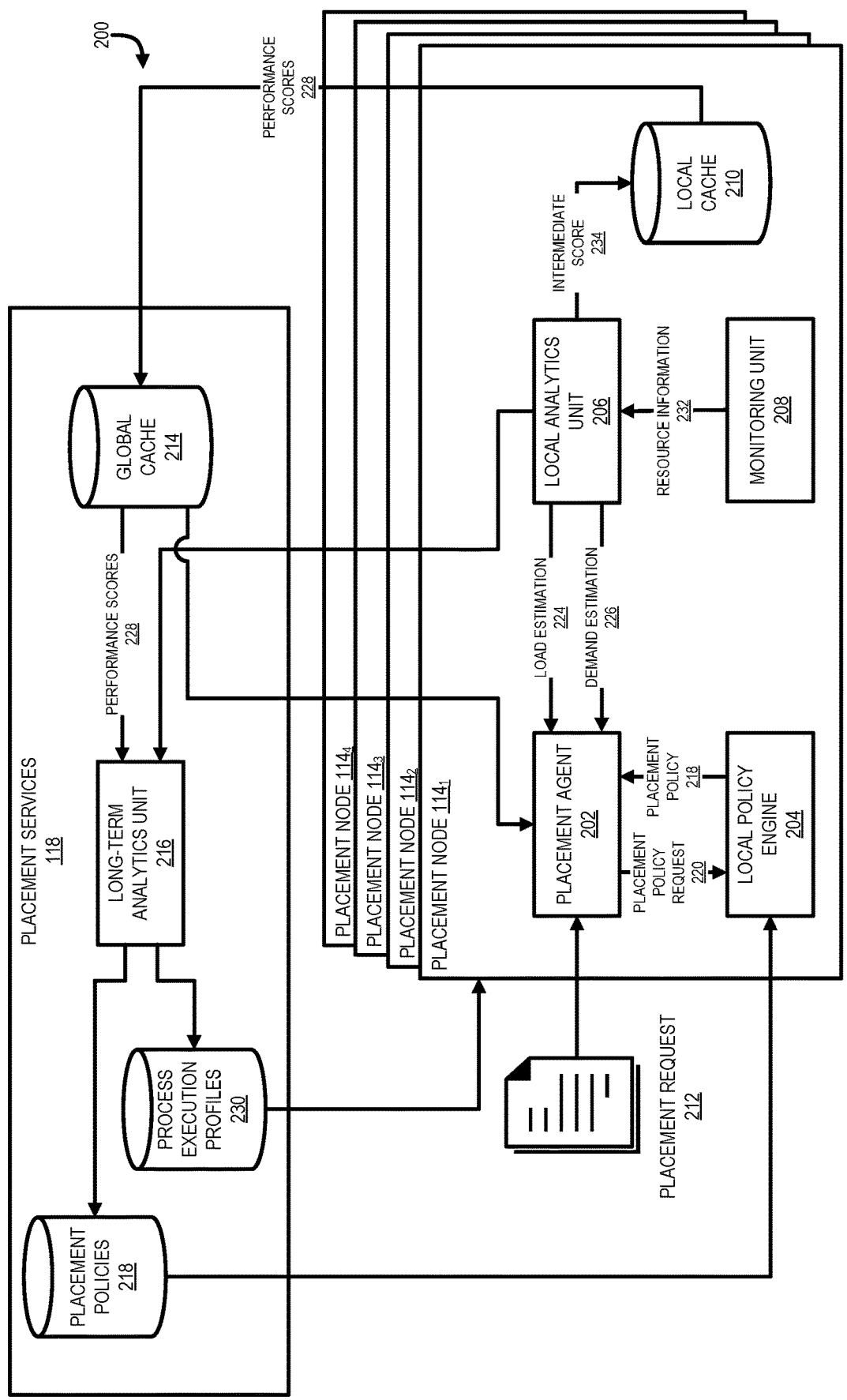
FIG. 2 shows a control loop for the fulfillment of placement requests and the automatic optimization of placement policies and process execution profiles, according to one example embodiment.

As will be described in greater detail below, placement policies and process execution profiles are optimized without needing manual configuration by a user or an administrator. In some embodiments, multiple entities are involved in this optimization procedure. FIG. 2 shows a control loop 200 for the fulfillment of placement requests 212 and the automatic optimization of placement policies 218 and process execution profiles 230, according to one example embodiment. As shown in FIG. 2, each placement node 114 includes a placement agent 202, a local policy engine 204, a local analytics unit 206, a monitoring unit 208, and a local cache 210. As will be described in greater detail below, the components of the placement nodes 114 work in conjunction with the placement services 118, including the global cache 214 and the long-term analytics unit 216, to fulfill placement requests 212.

When a placement request 212 is received by a placement node 114 from a process agent 112 of a client device 108, the placement agent 202 in the receiving placement node 114 finds the next possible placement candidate/contact/node, which is dictated by a placement policy 218 received from the local policy engine 204. The placement policies 218 are goals/objectives that are associated with a placement node 114 and/or a process 110. Further, the placement policies 218 are fulfilled through the use of a variety of placement algorithms, and the placement policies are 218 used by the placement agent 202 to make resource allocation/placement decisions for processes 110. A placement policy 218 is configurable and can be altered to utilize a variety of corresponding different placement algorithms. For example, the long-term analytics unit 216 may initially assign a round robin algorithm for achieving the goals of a balanced load placement policy 218 and later determine, based on input from the analytics unit 206 (e.g., a score) and/or the monitoring unit 208, that the balanced load goals of the balanced load placement policy 218 are not fulfilled as expected when using the round robin algorithm. To potentially correct for this failure, the long-term analytics unit 216 may later assign a random of two algorithm for the balanced load placement policy 218 in an attempt to fulfill the balanced load goals of the balanced load placement policy 218.

Placement policies 218 are not necessarily universally applied in the datacenter system 100, but instead different placement policies 218 can coexist in the datacenter system 100. For example, different placement policies 218 may be associated with each placement node 114 and/or process 110. As shown in FIG. 2, the placement policies 218 are provided to the local policy engine 204 for use by a corresponding placement agent 202 of a placement node 114.

In addition to placement policy 218 information, the placement node 114 may receive process execution profiles 230 from the placement services 118 for determining resource allocation for processes 110. Each of the process execution profiles 230 indicates a variety of information related to the execution of a corresponding process 110. For example, a process execution profile 230 may indicate minimal, average, and maximum processor, memory, and/or I/O usage on a set of servers 102 for a process 110, affinity rules for grouping processes 110 with the same set of resources, anti-affinity rules for excluding processes 110 from being grouped with the same set of resources, and/or priority information for assigning a priority for processing/execution of a process 110. In some embodiments, each process execution profile 230 may include different types and/or levels of details regarding execution of processes 110. For example, one process execution profile 230 may utilize a classification system that indicates a type of the process 110 (e.g., a compute intensive process, a I/O intensive process, a network intensive process, etc.). In one embodiment, a process execution profile 230 for resource allocation may include (1) a profile name (i.e., a unique identity for the process execution profile 230), (2) a process type (e.g., compute intensive process, a I/O intensive process, a network intensive process, etc.), (3) a process scale (e.g., a small process, a medium process, or a large process and/or a process with sub-processes, threads, etc.); and (4) a default demand (i.e., a time sequenced resource demand, where the total time is the execution lifespan for the process 110). One or more pieces of this information may be used for determining an estimated demand of the associated process 110. Generating process execution profiles 230 can be performed by the local analytics unit 206 and/or the long-term analytics unit 216 that classify processes 110 via learning the history demands of successfully executed processes 110.

In response to a placement request 212, the placement agent 202 may transmit/pass a placement policy request 220 to the local policy engine 204. In response, the local policy engine 204 may return a placement policy 218 to the placement agent 202. If the placement agent 202 determines based on the placement policy 218 that the next candidate/contact for placement is the local/current placement node 114 (e.g., the placement policy 218 is a local-first placement policy), the placement agent 202 determines a load estimation 224 of the local placement node 114 and the demand estimation 226 of the process 110 from the local analytics unit 206. For example, the monitoring unit 208 may provide resource information 232 to the local analytics unit 206. The resource information 232 may describe current resource usage that is monitored by the monitoring unit 208. The local analytics unit 206 may thereafter provide a load estimation 224 of the local placement node 114 and the demand estimation 226 of the process 110 to the placement agent 202. In one embodiment, the demand estimation 226 of the process 110 may be determined based on a process execution profile 230 associated with the process 110. The placement agent 202 will then try to match the demand estimation 226 to available resources as indicated by the load estimation 224 of the local placement node 114. If a match is failed to be achieved, the placement agent 202 will find the next candidate/contact/node for possible resource matching as dictated by the placement policy 218. In particular, the placement agent 202 may inquire with the global cache 214 of the placement services 118 to determine a next candidate/contact/node (e.g., a next placement node 114) for placement. For example, the next candidate/contact/node may correspond to the placement node 114 with a highest score 228. The next candidate/contact will repeat the process described above until placement of the process 110 is achieved. The term "process placement" used in the described embodiments may correspond to the alternative term "task scheduling".

After placement of resources for the process 110 and execution of the process 110, an intermediate score 234, which is associated with a corresponding process execution profile 230, is generated by the local analytics unit 206. The intermediate score 234 indicates either successful execution of the process 110 (e.g., a positive value for the intermediate score 234) or unsuccessful execution of the process 110 (e.g., a negative value for the intermediate score 234). When the intermediate score 234 indicates successful execution of the process 110 (e.g., a positive value for the intermediate score 234), a performance score 228 for the process execution profile 230 is updated/incremented in both the local cache 210 and the global cache 214. Conversely, when the intermediate score 234 indicates unsuccessful execution of the process 110 (e.g., a negative value for the intermediate score 234), no action is taken regarding updating a performance score 228 for the process execution profile 230. As described herein, the performance score 228 will be used for long-term analytics performed by the long-term analytics unit 216, which can add/delete/update process execution profiles 230. For example, in response to a low performance score 228 for a process 110 using an existing process execution profile 230, the long-term analytics unit 216 can add a new process execution profile 203 that is different from the previous process execution profile 230 (e.g., increase a scale of the process 110) and optionally delete the previous process execution profile 230. The long-term analytics unit 216, which is part of the placement services 118, can also modify placement policies 218 (e.g., select a new algorithm for a placement policy 218 or modify a scope/domain for a placement policy 218 in response to a low score 228) to support placement of processes 110 (e.g., achieve a desired goal/objective of a placement policy 218).

As noted above, the local analytics unit 206 may generate an intermediate score 234 based on the execution of processes 110. Each process 110 in a system executes a specific piece of code that is assembled in a binary file. Different processes 110 may execute code from different or the same binary file. In some cases, an application on a client device 108 spawns/creates a new process 110 to handle a new request or task. The process 110 will execute until finished and thereafter will terminate. Accordingly, each new instance of the same binary file will be executed repeatedly as new requests/tasks are received. By monitoring execution of the binary file/process 110 via the monitoring unit 208, a process execution profile 230 of the resource demands can be determined for the process 110. The process execution profile 230 can then be used to predict the resource demands of a new process 110 that will execute the same binary file. As noted above, in response to a low intermediate score 234 (e.g., an intermediate score 234 that is negative) for a process 110 using a particular process execution profile 230, a new process execution profile 230 may be added/generated. The new process execution profile 230 may seek to more accurately predict resource/execution requirements of the process 110. With more accurate predictions, it becomes easier to place and mix processes 110 together having resource demands that do not conflict with each other leading to a datacenter system 100 with better performance and higher resource utilization. Accordingly, accurate predictions rely on process execution profiles 230 that model the resource demand of processes 110 over time.

In some embodiments, an ant colony algorithm (or a derivative ant colony algorithm) may be used for placement of resources. The ant colony algorithm is used as an assistant process for placement of resources and does not compete or supplant the algorithm used by a placement policy 218 (e.g., a round robin or random of two algorithms used by a placement policy 218). Instead, the ant colony algorithm works together with the algorithm of a placement policy 218.

In the ant colony algorithm described herein, an ant may be represented by the placement agent 202, which finds a path between a resource demand (e.g., described by a process execution profile 230 of the process 110) and a set of resources (e.g., a server 102). A pheromone is the performance score 228 and/or intermediate score 234 given by local analytics unit 206 after execution of a process 110 with the process execution profile 230. A food path is a link between a process execution profile 230 and a set of resources. Paths (i.e., links between process execution profiles 230 and sets of resources) are stored in both the local cache 210, which stores local paths relative to the placement node 114, and the global cache 214, which stores a graph of all paths for all the placement nodes 114.

A performance score 228 is increased when there is a successful execution of a process 110 (e.g., requirements of a service level agreement are fulfilled), while performance scores 228 decrease/evaporate automatically over time. A path is deleted/removed if the score 228 reaches a value of zero.

Figure 3A:
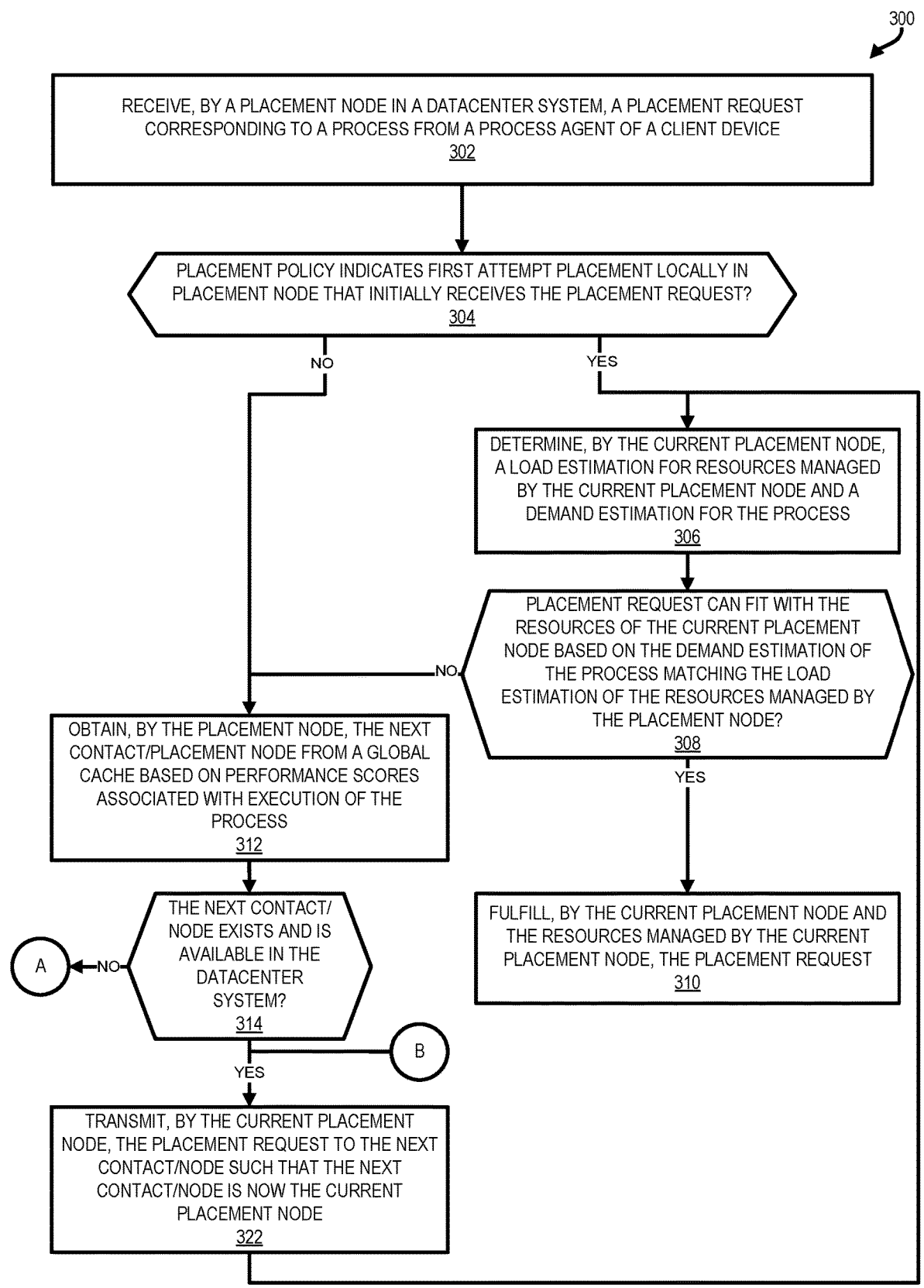
FIGS. 3A and 3B show a flow diagram that illustrates a method for searching caches to determine process placement, according to one example embodiment.
Figure 3B:
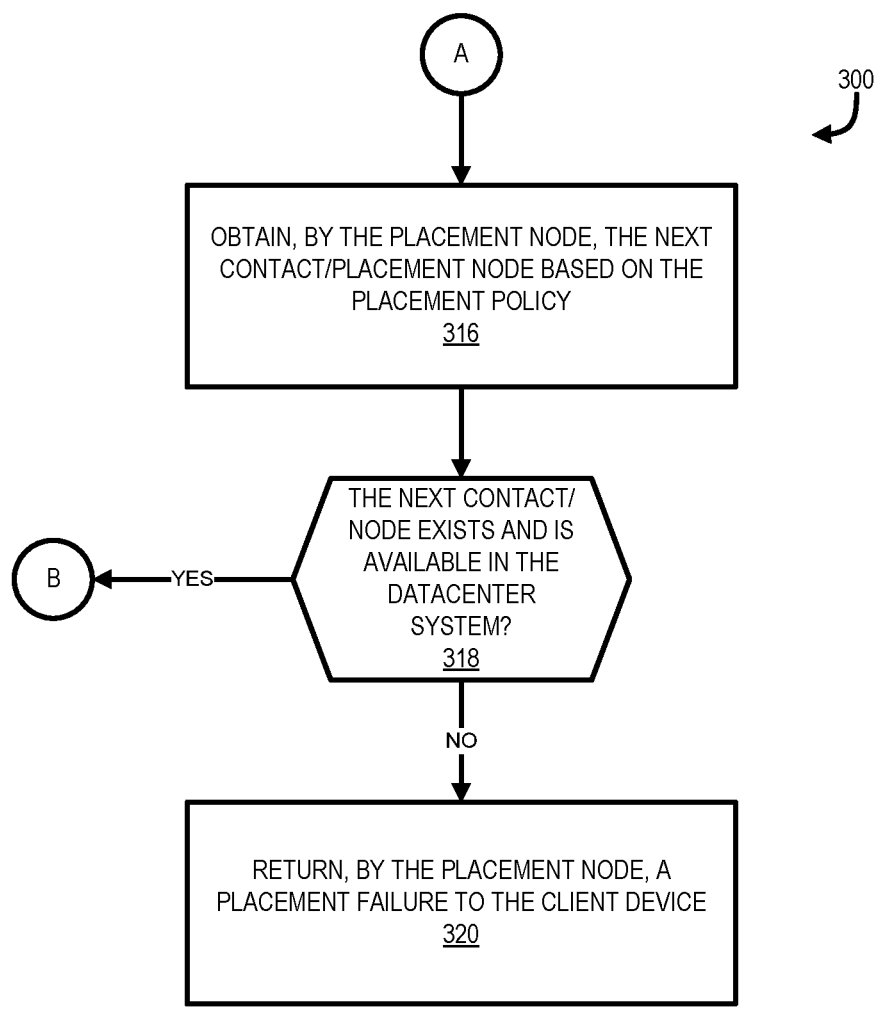

The ant colony algorithm includes two main procedures (1) searching caches 210/214 for resource placement and (2) updating caches 210/214. FIGS. 3A and 3B present a flow diagram that illustrates a method 300 for searching caches 210/214 to determine process 110 placement, according to one example embodiment. The method 300 may utilize a derivative of an ant colony algorithm to assist in process 110 placement decision-making. The operations in the flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagrams.

As shown in FIG. 3A, the method 300 may commence at operation 302 with a placement node 114 receiving a placement request 212. The placement request 212 may be received from a process agent 112 of a client device 108 and may correspond to a process 110 monitored or managed by the placement agent 202. For example, the process agent $112_1$ of the client device $108_1$ may transmit a placement request to the placement agent 202 of the placement node $114_1$ via the network 116.

At operation 304, the placement agent 202 determines if a placement policy 218 indicates a local first approach/algorithm. In particular, if the placement policy 218 for the process 110 or the placement node 114 initially receiving the placement request 212 indicates that the placement request 212 should attempt to be fulfilled by the local placement node 114 first before attempting to query the global cache 214 for a candidate placement node 214, the method 300 moves to operation 306. Otherwise, the method 300 moves to operation 312.

At operation 306, the current placement node 114 (i.e., the placement node 114 that initially received the placement request 212 from the process agent 112 at operation 302) determines a load estimation 224 of the resources monitored or managed by the placement node 114 and the demand estimation 226 of the process 110 based on a process execution profile 230. For example, at operation 306, the local analytics unit 206 of the placement node $114_1$ may determine that the servers $102A_1$-$102A_Z$ have eight-gigabytes of free memory based on resource information 232 received from the monitoring unit 208 of the placement node $114_1$, and a process execution profile 230 associated with the process $110_1$ indicates a predicted/estimated demand of four-gigabytes of memory to fulfill all the requirements of a service level agreement. In one embodiment, the demand estimation 226 may be based on a process execution profile 230 associated with the process $110_1$ in the local cache 210 with the highest associated score 228. As noted above, process execution profiles 230 indicate parameters/attributes associated with execution of a process 110. Over time, the long-term analytics unit 216 may add new process execution profiles 230 with new predictions regarding the demands of processes 110. With better predictions, the local analytics unit 206 generates higher performance scores 228. Accordingly, selecting the process execution profile 230 in the local cache 210 with the highest performance score 228 ensures that the best performing prediction is being utilized to determine a demand estimation 226 for the process 110.

At operation 308, the current placement node 114 determines whether the resources managed by the placement node 114 can fulfill the demand of the process 110. Using the example above, the placement node $114_1$ determines at operation 308 that the resources managed by the placement node $114_1$ can fulfill the demand of the process $110_1$ because the process $110_1$ requires four-gigabytes of memory to fulfill all the requirements of a service level agreement and the servers $102A_1$-$102A_Z$ have eight-gigabytes of free memory. In another example, the placement node $114_1$ may determine at operation 306 that (1) the process $110_1$ requires four-gigabytes of memory to fulfill all the requirements of a service level agreement and (2) the servers $102A_1$-$102A_Z$ have two-gigabytes of free memory. Accordingly, in this example, the placement node $114_1$ determines at operation 308 that the resources managed by the placement node $114_1$ cannot fulfill the demand of the process $110_1$. When the current placement node 114 determines at operation 308 that the resources managed by the placement node 114 can fulfill the demand of the process 110, the method 300 moves to operation 310 for the current placement node 114 to fulfill the placement request 212 locally (i.e., using the resources managed by the placement node 114).

Conversely, when the current placement node 114 determines at operation 308 that the resources managed by the placement node 114 cannot fulfill the demand of the process 110, the method 300 moves to operation 312. The method 300 may similarly move to operation 312 when the current placement node 114 determines at operation 304 that the placement policy 218 indicates that the placement request 212 should not or does not need to attempt to be fulfilled by the local/receiving placement node 114 first before attempting to querying the global cache 214 for a candidate placement node 114.

At operation 312, the placement agent 202 obtains the next contact from the global cache 214 based on the placement request 212. In particular, the placement agent 202 queries the global cache 214 for a process execution profile 230 with the highest score 228 (or next highest score 228).

At operation 314, the placement agent 202 of the current placement node 114 determines if the contact still exists and is available. In particular, since the performance scores 228 stored in the caches 210/214 are based on historical data, it is possible that the associated placement node 114 and/or resources managed by the associated placement node 114 are down or otherwise not currently available. When the placement agent 202 determines that the contact still exists and is available, the current placement node 114 transmits the placement request to the next contact/placement node 114 at operation 322 such that the next contact/placement node 114 is now the current placement node 114. Subsequently, the method 300 moves to operation 306 for the current placement node 114 to attempt placement of resources for the process 110.

Alternatively, when the placement agent 202 determines at operation 314 that the next contact/placement node 114 does not still exist or is otherwise unavailable, the method 300 moves to operation 316 to obtain the next contact from the global cache 214 based on a placement policy 218.

At operation 318, the placement agent 202 of the current placement node 114 again determines if the contact still exists and is available. When the placement agent 202 determines that the contact still exists and is available, the current placement node 114 transmits the placement request to the next contact/placement node 114 at operation 322 such that the next contact/placement node 114 is now the current placement node 114. However, when the placement agent 202 determines at operation 318 that the next contact/placement node 114 does not still exist or is otherwise unavailable, the method 300 moves to operation 320. At operation 320, the current placement node 114 returns a placement failure message to the client device 108, which originally initiated the placement request.

Figure 4:
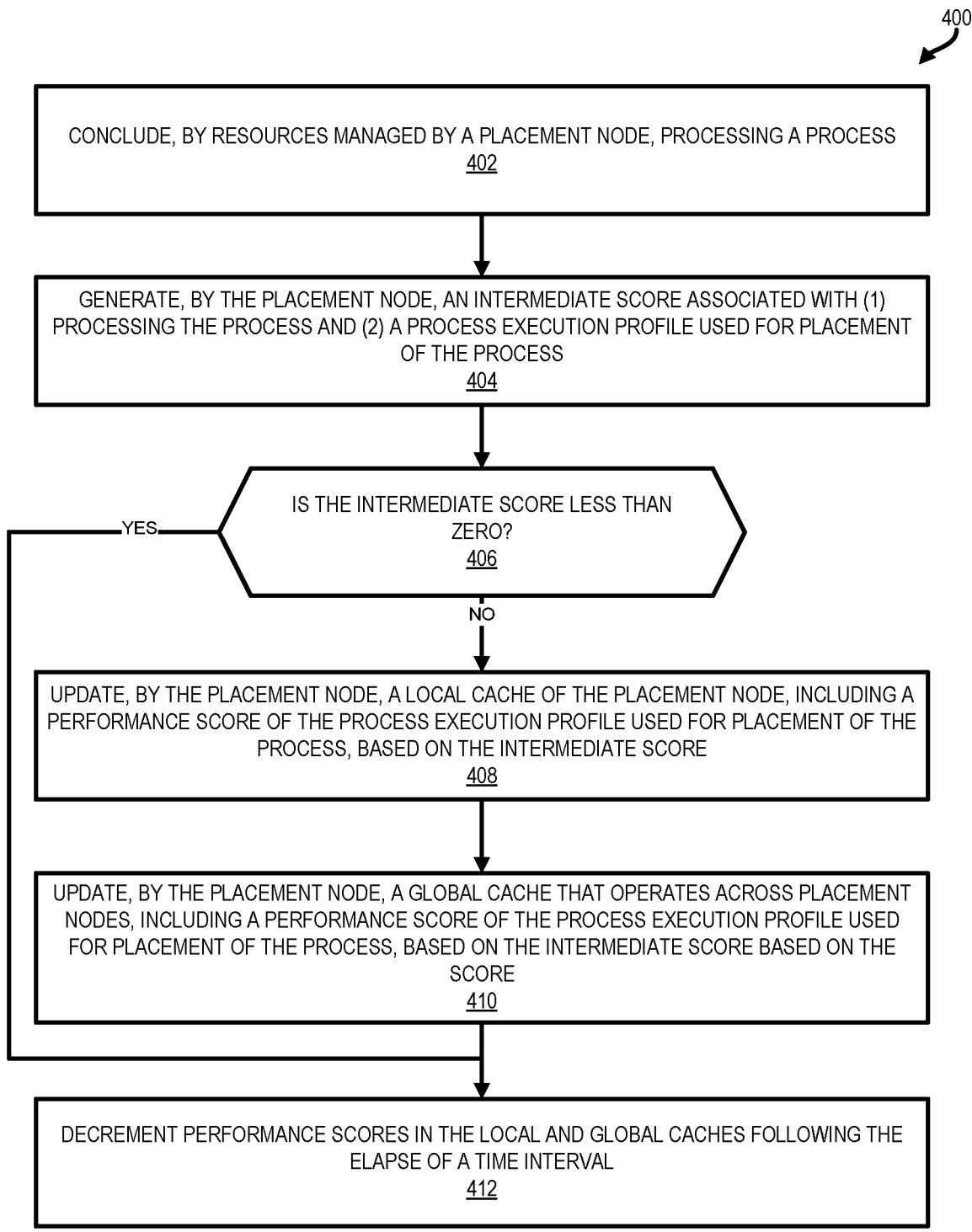
FIG. 4 shows a flow diagram that illustrates a method for updating caches to support placement of processes, according to one example embodiment.

Turning now to FIG. 4, a method 400 for updating caches 210/214 to support placement of processes 110, according to one example embodiment, will be described. The operations in the flow diagram of FIG. 4 will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagrams.

In one embodiment, the method 400 may be performed following the conclusion of the method 300. In particular, following fulfillment of the placement request 212 of a process 110 at operation 310 of the method 300 by a placement node 114, resources managed by the placement node 114 may conclude processing the process 110 at operation 402 of the method 400.

At operation 404, the local analytics unit 206 of the placement node 114 that fulfilled the placement request 212 generates an intermediate score 234. The intermediate score 234 may be generated based on the processing of the process 110 by the resources managed by the placement node 114 and is associated with a process execution profile 230 used for placement of the process 110. For example, in response to failing to meet the requirements of one or more associated service level agreements or otherwise unsuccessfully executing/processing the binary file representing the process 110, the local analytics unit 206 may return a negative value for the intermediate score 234, which is associated with a process execution profile 230 used for placement of the process 110.

Conversely, in response to successfully executing/processing the binary file representing the process 110 and/or meeting the requirements of one or more associated service level agreements, the local analytics unit 206 may return a positive value for the intermediate score 234. In this case, the intermediate score 234 may be (1) a set value (e.g., a value of one) or (2) a relative value based on the quality of processing/execution of the binary file representing the process 110.

At operation 406, the local analytics unit 206 of the placement node 114 determines whether the intermediate score 234 generated at operation 404 is less than zero (i.e., a negative value) or greater than zero (i.e., a positive value).

In response to determining that the intermediate score 234 is a positive value, the method 400 moves to operation 408 to update, by the local analytics unit 206 of the placement node 114, the local cache 210. Similarly, the local analytics unit 206 of the placement node 114 updates the global cache 214, which operates across placement nodes 114, at operation 410. In particular, the performance score 228 for the process execution profile 230 may be updated/incremented at operation 410 based on the intermediate score 234 generated at operation 404. In some embodiments, this update may include adding the intermediate score 234 to the performance score 228 or incrementing the performance score 228 by a preset value.

Following operations 408 and 410 or in response to determining at operation 406 that the intermediate score 234 generated at operation 404 is less than zero, the method 400 moves to operation 412. At operation 412, the placement nodes 114 decrement all performance scores 228 for all process execution profiles 230 stored in the local cache 210 and the placement services 118 decrement all performance scores 228 for all process execution profiles 230 stored in the global cache 214 following the elapse of a time interval. For example, the time interval may be one second, thirty seconds, five minutes, or any other time value. After the time interval has elapsed, the performance scores 228 associated with all process execution profiles 230 stored in the local cache 210 and in the global cache 214 are decremented by a predefined decrement value. The predefined decrement value may be a fixed value (e.g., a value of one-tenth, two-tenths, etc.) or a relative value (i.e., ten percent of the current score). Accordingly, after each occurrence of the time interval being elapsed, performance scores 228 associated with process execution profiles 230 automatically decrement. In some embodiments, upon reaching a value of zero, an associated process execution profile 230 is removed from the local cache 210 and/or the global cache 214.

Figure 5A:
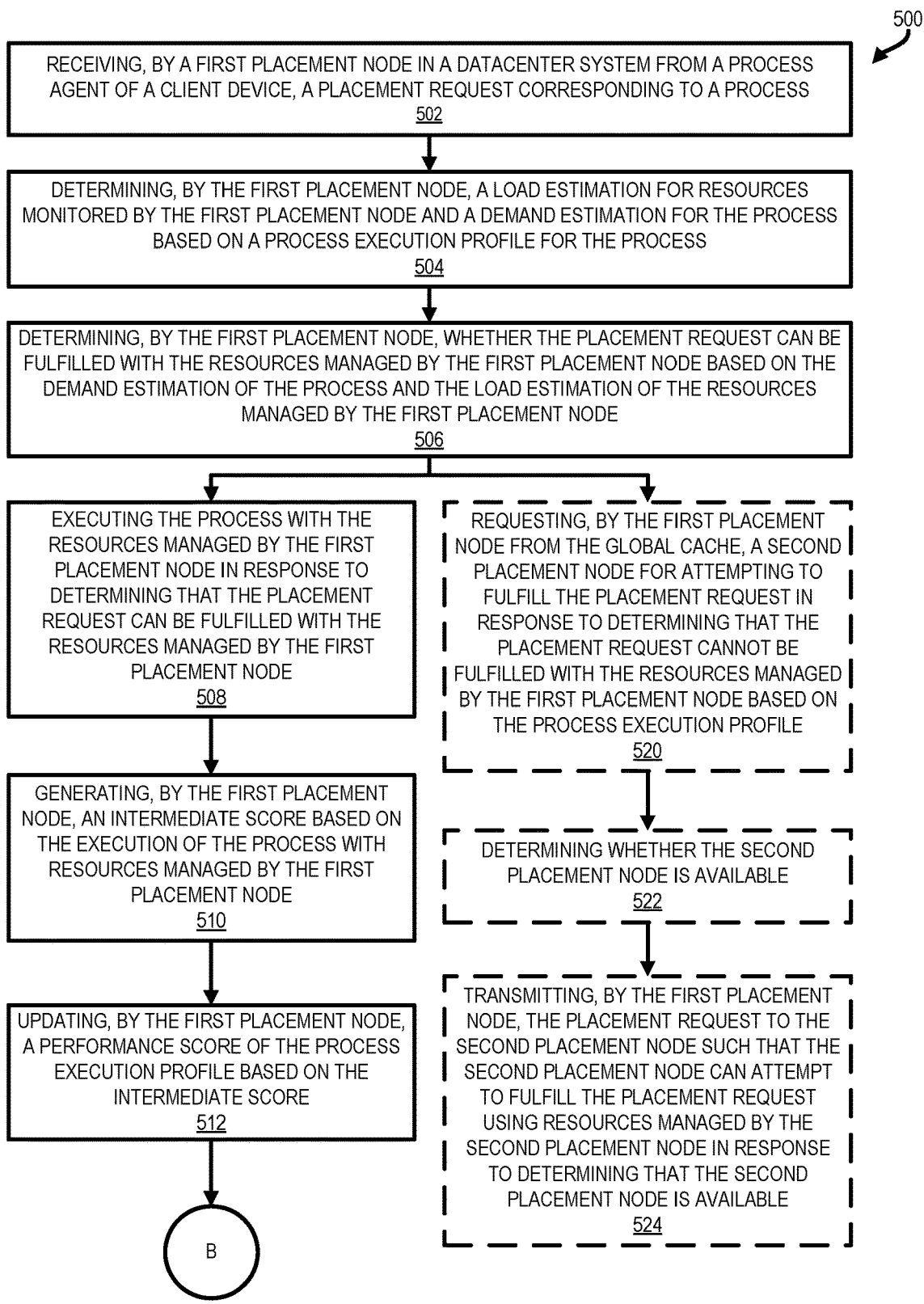
FIGS. 5A and 5B show a flow diagram that illustrates a method for placement of processes in the distributed datacenter, according to one example embodiment.
Figure 5B:
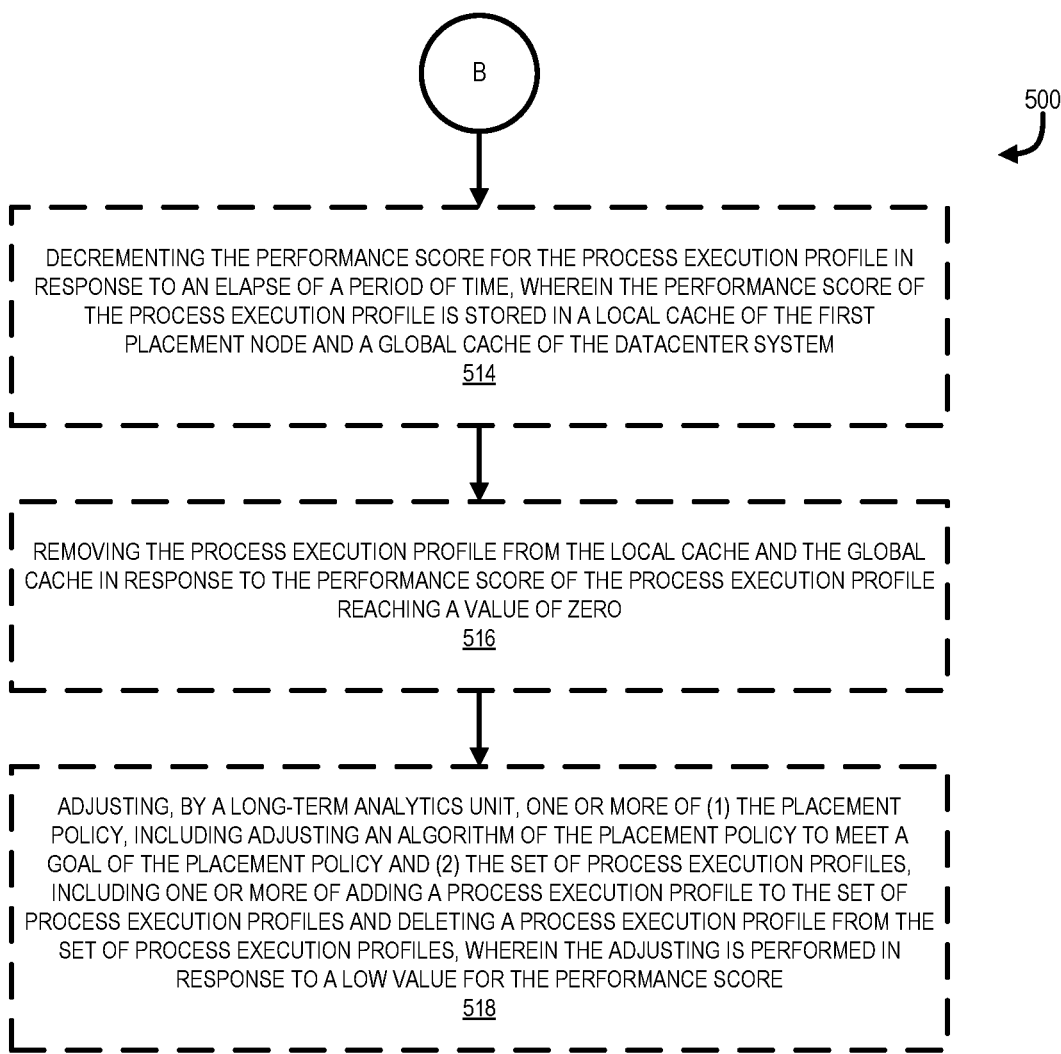

Turning now to FIGS. 5A and 5B, a method 500 for placement of processes 110 in the distributed datacenter 100, according to one example embodiment, will be described. The operations in the flow diagram of FIGS. 5A and 5B will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagrams.

As shown in FIG. 5A, the method 500 may commence at operation 502 with a first placement node 114 in the datacenter system 100 receiving from a process agent 112 of a client device 108 a placement request 212 corresponding to a process 110. For example, the placement node $114_1$ in the datacenter system 100 receives from the process agent $112_1$ of the client device $108_1$ a placement request 212 corresponding to a process $110_1$ at operation 502. This example set of entities/components will be used for purposes of illustrating the performance of the method 500.

At operation 504, the first placement node $114_1$ determines a load estimation 224 for resources $102A_1$-$102A_Z$ managed by the first placement node $114_1$ and a demand estimation 226 for the process $110_1$ based on a process execution profile 230 for the process $110_1$. In one embodiment, the process execution profile 230 includes one or more of a process type for the process $110_1$, a process scale for the process $110_1$, and a default resource demand for the process $110_1$. In one embodiment, the determining, by the first placement node $114_1$, a load estimation 224 for resources $102A_1$-$102A_Z$ managed by the first placement node $114_1$ and a demand estimation 226 for the process $110_1$ based on a process execution profile 230 for the process $110_1$ is performed based on a placement policy 218. In one embodiment, the placement policy 218 is a local first placement policy 218 that attempts placement of the process $110_1$ by the placement node $114_1$ originally receiving the placement request 212 before attempting placement using other placement nodes 114 in the datacenter system 100.

At operation 506, the first placement node $114_1$ determines whether the placement request 212 can be fulfilled with the resources managed by the first placement node $114_1$ based on the demand estimation 226 of the process $110_1$ and the load estimation 224 of the resources managed by the first placement node $114_1$.

At operation 508, the process $110_1$ executes with the resources managed by the first placement node $114_1$ in response to determining that the placement request 212 can be fulfilled with the resources managed by the first placement node $114_1$ at operation 506.

At operation 510, the first placement node $114_1$ determines an intermediate score 234 based on the execution of the process $110_1$ with resources managed by the first placement node $114_1$.

At operation 512, the first placement node $114_1$ updates a performance score 228 of the process execution profile 230 based on the intermediate score 234. In one embodiment, the performance score 228 of the process execution profile 230 is increased in response to the intermediate score 234 indicating a successful execution of the process $110_1$ using the resources managed by the first placement node $114_1$.

At operation 514, the performance score 228 is decremented for the process execution profile 230 in response to an elapse of a period of time. In one embodiment, the performance score 228 of the process execution profile 230 is stored in a local cache 210 of the first placement node $114_1$ and a global cache 214 of the datacenter system 100.

At operation 516, the process execution profile 230 is removed from the local cache 210 and the global cache 214 in response to the performance score 228 of the process execution profile 230 reaching a value of zero.

At operation 518, the long-term analytics unit 216 adjusts one or more of (1) the placement policy 218, including adjusting an algorithm of the placement policy 218 to meet a goal of the placement policy 218 and (2) the set of process execution profiles 230, including one or more of adding a process execution profile 230 to the set of process execution profiles 230 and deleting a process execution profile 230 from the set of process execution profiles 230. In one embodiment, the adjusting is performed in response to a low value for the performance score 228.

Returning to operation 506, in response to determining that the placement request 212 cannot be fulfilled with the resources managed by the first placement node $114_1$ based on the process execution profile 230 at operation 506, the first placement node $114_1$ requests from the global cache 214 at operation 520 a second placement node $114_2$ for attempting to fulfill the placement request 212. In one embodiment, the second placement node $114_2$ is selected from the global cache 214 based on performance scores 228 associated with a set of process execution profiles 230 or a placement policy 218 is used to select a third placement node $114_3$ in response to determining that the second placement node $114_2$ is unavailable.

At operation 522, the first placement node $114_1$ determines whether the second placement node $114_2$ is available.

At operation 524, the first placement node $114_1$ transmits the placement request 212 to the second placement node $114_2$ such that the second placement node $114_2$ can attempt to fulfill the placement request 212 using resources $102B_1$-$102B_Y$ managed by the second placement node $114_2$ in response to determining that the second placement node $114_2$ is available.

As described herein, placement policies 218 and process execution profiles 230 are optimized without needing manual configuration by a user or an administrator. In particular, through the generation of performance scores 228 that describe the performance of execution of a process 110 using a particular process execution profile 230, the datacenter system 100 can intelligently estimate process 110 resource demands for use in process 100 placement.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 6A illustrates connectivity between network devices (NDs) within an exemplary network, as well as three exemplary implementations of the NDs, according to some embodiments. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650, a placement node 114, and/or placement services 118. During operation, the processor(s) 642 execute the software 650, a placement node 114, and/or placement services 118 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
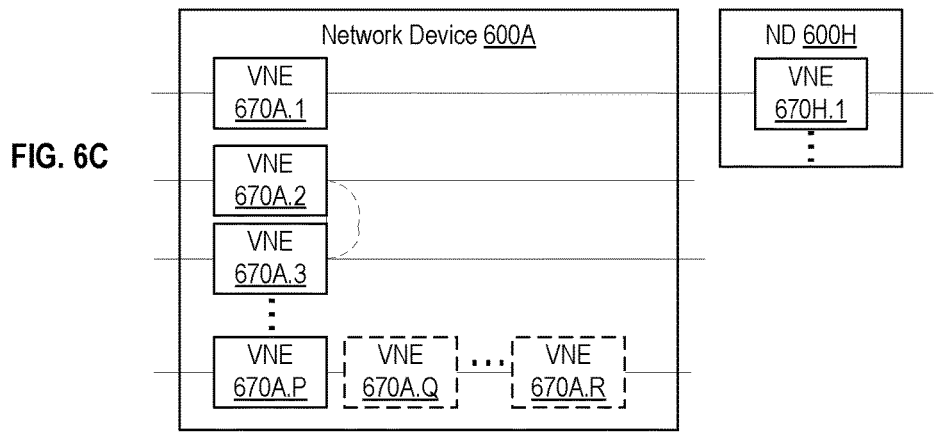
FIG. 6C illustrates various exemplary ways in which virtual network elements (VNEs) may be coupled according to some embodiments.

FIG. 6C illustrates various exemplary ways in which VNEs may be coupled according to some embodiments. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
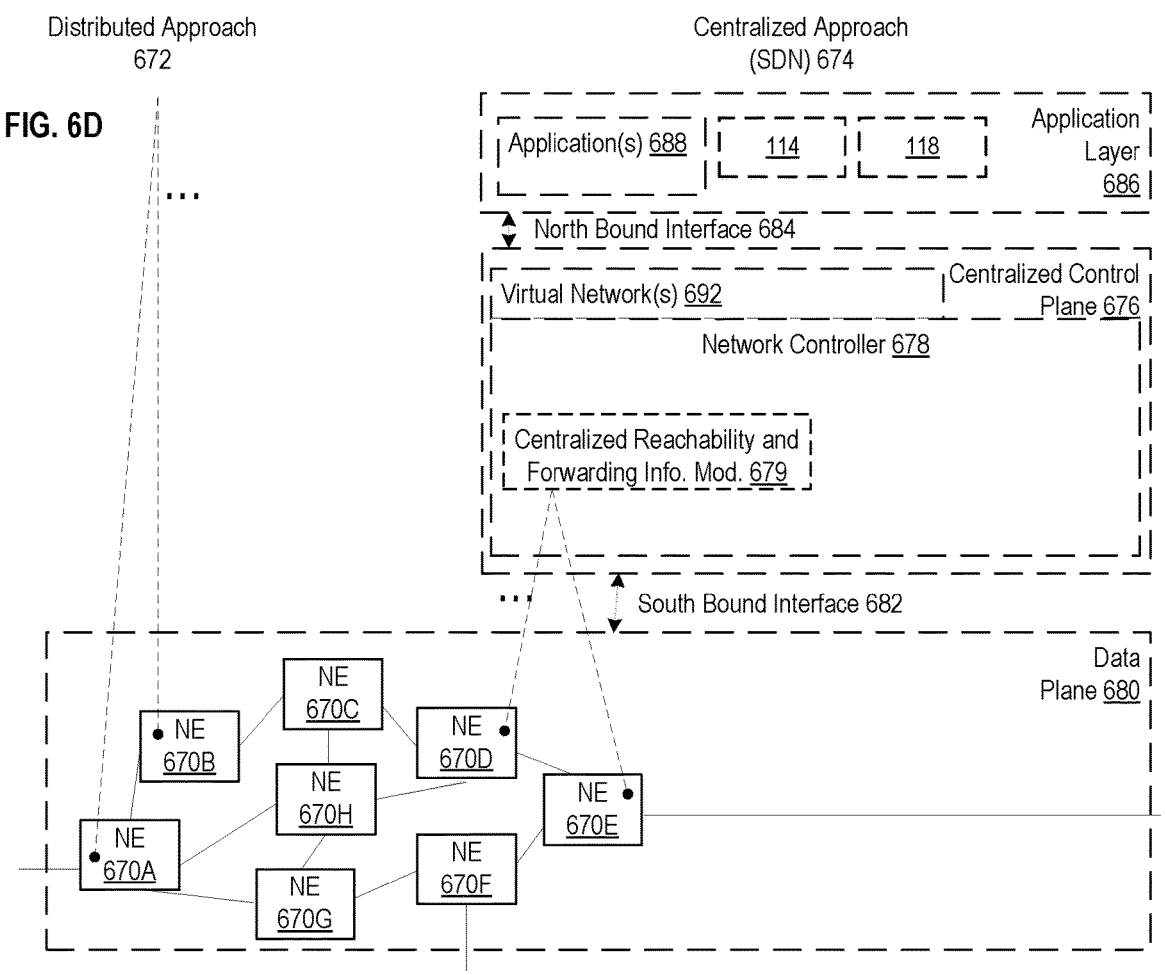
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688, a placement node 114, and/or placement services 118. The centralized control plane 676 has the ability to form virtual networks 692 (sometimes referred to as a logical forwarding plane, network services, or overlay networks (with the NEs 670A-H of the data plane 680 being the underlay network)) for the application(s) 688, placement nodes 114, and/or placement services 118. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
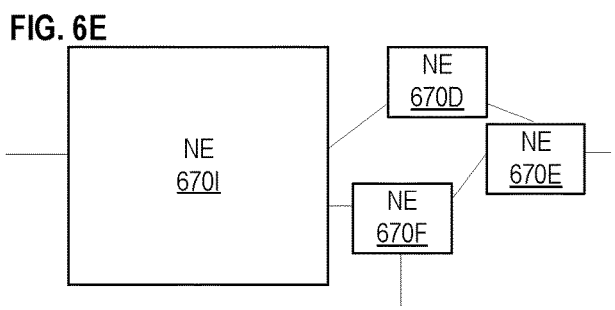
FIG. 6E illustrates the simple case of where each of the NDs implements a single NE, but a centralized control plane has abstracted multiple of the NEs in different NDs into (to represent) a single NE in one of the virtual network(s), according to some embodiments.
Figure 6F:
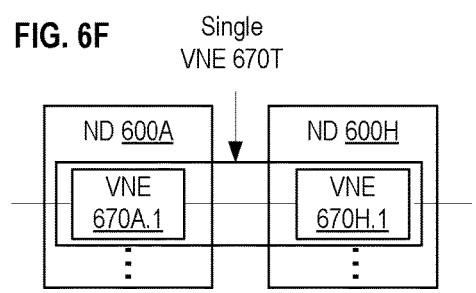
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments. Thus, the abstraction of a NE or VNE can span multiple NDs.

While some embodiments implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
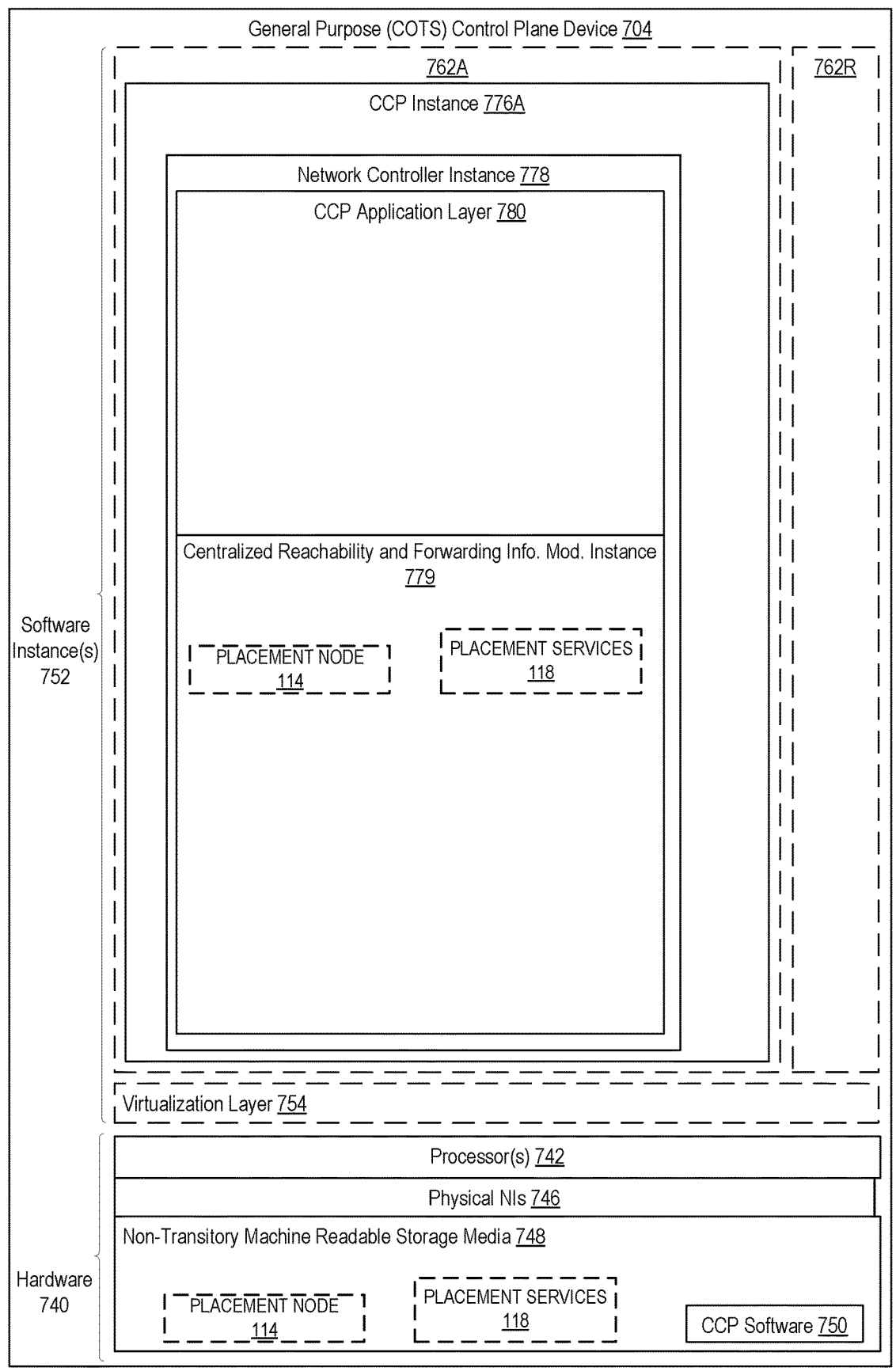
FIG. 7 illustrates a general purpose control plane device with centralized control plane (CCP) software 750), according to some embodiments.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and physical NIs 746, as well as non-transitory machine readable storage media 748 having stored therein centralized control plane (CCP) software 750, a placement node 114, and/or placement services 118.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs and for processing placement nodes 114 and/or placement services 118), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for placement of processes in a distributed datacenter, the method comprising:
receiving, by a first placement node in the distributed datacenter from a process agent of a client device, a placement request corresponding to a process;
determining, by the first placement node, a load estimation for resources managed by the first placement node and a demand estimation for the process based on a process execution profile for the process;

determining, by the first placement node, whether the placement request can be fulfilled with the resources managed by the first placement node based on the demand estimation of the process and the load estimation of the resources managed by the first placement node;

executing the process with the resources managed by the first placement node in response to determining that the placement request can be fulfilled with the resources managed by the first placement node;

generating, by the first placement node, an intermediate score based on the execution of the process with resources managed by the first placement node;

updating, by the first placement node, a performance score of the process execution profile based on the intermediate score;

when determined that the placement request cannot be fulfilled with the resources managed by the first placement node based on the process execution profile, requesting from a global cache of the distributed datacenter, a second placement node for attempting to fulfill the placement request, wherein the global cache maintains a plurality of process execution profiles and respective performance scores for a plurality of placement nodes of the distributed datacenter, including the first placement node;

determining that the second placement node is available; and transmitting, by the first placement node, the placement request to the second placement node such that the second placement node can attempt to fulfill the placement request using resources managed by the second placement node in response to determining that the second placement node is available, and wherein the performance score of the process execution profile is increased in response to the intermediate score indicating a successful execution of the process using the resources managed by the first placement node or transferring the placement request to the second placement node.

2. The method of claim 1, further comprising:

decrementing the performance score for the process execution profile in response to an elapse of a period of time, wherein the performance score of the process execution profile is stored in a local cache of the first placement node and the global cache; and removing the process execution profile from the local cache and the global cache in response to the performance score of the process execution profile reaching a value of zero.

3. The method of claim 1, wherein the process execution profile includes one or more of a process type for the process, a process scale for the process, and a default resource demand for the process.

4. The method of claim 1, wherein when the second placement node is not available, selecting a third placement node.

5. The method of claim 1, wherein the determining, by the first placement node, the load estimation for resources managed by the first placement node and the demand estimation for the process based on the process execution profile for the process is performed based on a placement policy.

6. The method of claim 5, wherein the placement policy is a local first placement policy that attempts placement of the process by the placement node originally receiving the placement request before attempting placement using other placement nodes in the distributed datacenter.

7. The method of claim 5, further comprising:

adjusting, by a long-term analytics unit, one or more of (1) the placement policy, including adjusting an algorithm of the placement policy to meet a goal of the placement policy and (2) a set of process execution profiles, including one or more of adding a process execution profile to the set of process execution profiles and deleting a process execution profile from the set of process execution profiles, wherein the adjusting is performed in response to a low value for the performance score.

8. A non-transitory machine-readable storage medium that provides instructions that, when executed by a processor of a first placement node in a distributed datacenter, will cause said first placement node to perform operations comprising:

receiving, from a process agent of a client device, a placement request corresponding to a process;

determining a load estimation for resources managed by the first placement node and a demand estimation for the process based on a process execution profile for the process;

determining whether the placement request can be fulfilled with the resources managed by the first placement node based on the demand estimation of the process and the load estimation of the resources managed by the first placement node;

causing the process to be executed with the resources managed by the first placement node in response to determining that the placement request can be fulfilled with the resources managed by the first placement node;

generating an intermediate score based on the execution of the process with resources managed by the first placement node;

updating a performance score of the process execution profile based on the intermediate score;

when determined that the placement request cannot be fulfilled with the resources managed by the first placement node based on the process execution profile, requesting from a global cache of the distributed datacenter, a second placement node for attempting to fulfill the placement request, wherein the global cache maintains a plurality of process execution profiles and respective performance scores for a plurality of placement nodes of the distributed datacenter, including the first placement node;

determining that the second placement node is available; and transmitting the placement request to the second placement node such that the second placement node can attempt to fulfill the placement request using resources managed by the second placement node in response to determining that the second placement node is available, and wherein the performance score of the process execution profile is increased in response to the intermediate score indicating a successful execution of the process using the resources managed by the first placement node or transferring the placement request to the second placement node.

9. The non-transitory machine-readable storage medium of claim 8, wherein the operations further comprise:

decrementing the performance score for the process execution profile in response to an elapse of a period of time, wherein the performance score of the process execution profile is stored in a local cache of the first placement node and the global cache; and removing the process execution profile from the local cache and the global cache in response to the performance score of the process execution profile reaching a value of zero.

10. The non-transitory machine-readable storage medium of claim 8, wherein the process execution profile includes one or more of a process type for the process, a process scale for the process, and a default resource demand for the process.

11. The non-transitory machine-readable storage medium of claim 8, wherein when the second placement node is not available, selecting a third placement node.

12. The non-transitory machine-readable storage medium of claim 8, wherein the determining, by the first placement node, the load estimation for resources managed by the first placement node and the demand estimation for the process based on the process execution profile for the process is performed based on a placement policy.

13. The non-transitory machine-readable storage medium of claim 12, wherein the placement policy is a local first placement policy that attempts placement of the process by the placement node originally receiving the placement request before attempting placement using other placement nodes in the distributed datacenter.

14. The non-transitory machine-readable storage medium of claim 12, wherein the operations further comprise:

adjusting one or more of (1) the placement policy, including adjusting an algorithm of the placement policy to meet a goal of the placement policy and (2) a set of process execution profiles, including one or more of adding a process execution profile to the set of process execution profiles and deleting a process execution profile from the set of process execution profiles, wherein the adjusting is performed in response to a low value for the performance score.

15. A system for placement of processes in a distributed datacenter, the system comprising:

a memory unit that stores instructions; and a processor coupled to the memory unit to execute the instructions, wherein the instructions to cause the system to:

receive, from a process agent of a client device, a placement request corresponding to a process;

determine a load estimation for resources managed by a first placement node and a demand estimation for the process based on a process execution profile for the process;

determine whether the placement request can be fulfilled with the resources managed by the first placement node based on the demand estimation of the process and the load estimation of the resources managed by the first placement node;

cause the process to be executed with the resources managed by the first placement node in response to determining that the placement request can be fulfilled with the resources managed by the first placement node;

generate an intermediate score based on the execution of the process with resources managed by the first placement node;

update a performance score of the process execution profile based on the intermediate score;

when determined that the placement request cannot be fulfilled with the resources managed by the first placement node based on the process execution profile, request from a global cache of the distributed datacenter, a second placement node for attempting to fulfill the placement request, wherein the global cache maintains a plurality of process execution profiles and respective performance scores for a plurality of placement nodes of the distributed datacenter, including the first placement node;

determine that the second placement node is available; and transmit the placement request to the second placement node such that the second placement node can attempt to fill the placement request using resources managed by the second placement node in response to determining that the second placement node is available, and wherein the performance score of the process execution profile is increased in response to the intermediate score indicating a successful execution of the process using the resources managed by the first placement node or transfer the placement request to the second placement node.

16. The system of claim 15, wherein the instructions further cause the system to:

decrement the performance score for the process execution profile in response to an elapse of a period of time, wherein the performance score of the process execution profile is stored in a local cache of the first placement node and the global cache; and remove the process execution profile from the local cache and the global cache in response to the performance score of the process execution profile reaching a value of zero.

17. The system of claim 15, wherein the process execution profile includes one or more of a process type for the process, a process scale for the process, and a default resource demand for the process.

* * * * *